C. E. GEE.
MECHANICAL MOVEMENT.
APPLICATION FILED NOV. 24, 1913.

1,151,678.

Patented Aug. 31, 1915.

WITNESSES:
Sudger A. Nicol.
Samuel Ginsburg

INVENTOR
Charles E. Gee,
BY
Albert M. Moore,
His ATTORNEY

UNITED STATES PATENT OFFICE.

CHARLES E. GEE, OF LOWELL, MASSACHUSETTS.

MECHANICAL MOVEMENT.

1,151,678.      Specification of Letters Patent.    Patented Aug. 31, 1915.

Application filed November 24, 1913. Serial No. 802,797.

*To all whom it may concern:*

Be it known that I, CHARLES E. GEE, a citizen of the United States, residing at Lowell, in the county of Middlesex and Commonwealth of Massachusetts, have invented a certain new and useful Improvement in Mechanical Movements, of which the following is a specification.

This invention relates to mechanical movements of that kind in which a gear engaging a fixed rack is caused to travel by rotating on said fixed rack and imparts to a longitudinally movable rack parallel with said fixed rack a movement which is the sum of the movements due to the direct action of said gear on said movable rack and the travel of the center of said gear. Such a traveling gear is usually driven by a crank secured thereto and traveling therewith in a manner which is frequently very inconvenient.

The object of this invention is to provide means whereby the center of the crank or other part to which the power is applied may remain stationary, thus enabling a band-pulley to be substituted for a crank if desired.

I secure to the traveling gear concentrically therewith an involute gear with a radius of such variation that its teeth are always in engagement with a driving pinion which turns about a fixed stud or center.

Figure 1:
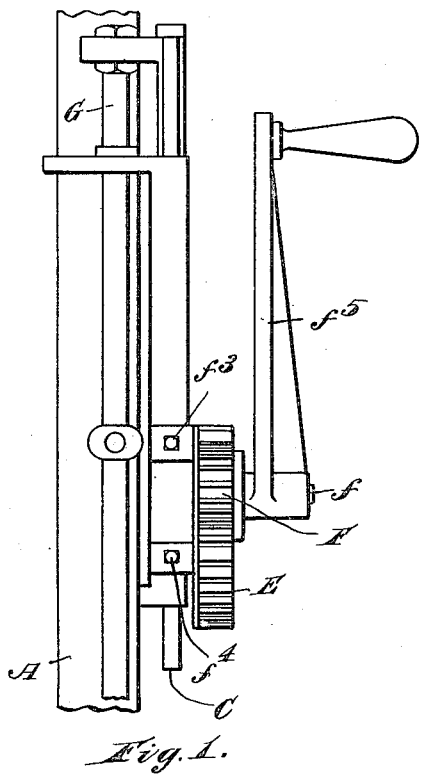
Figure 2:
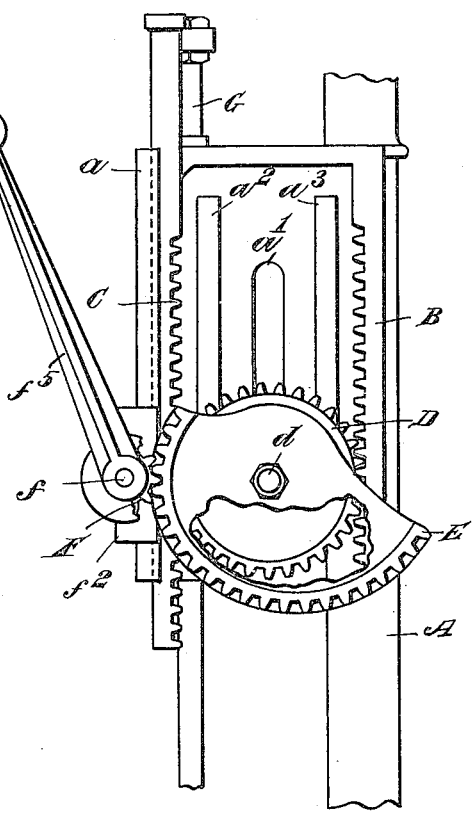

In the accompanying drawing, Figure 1 is a front elevation of a mechanical movement provided with my invention; Fig. 2, a side elevation of the same.

A indicates the frame for the support of the fixed rack B and of the sliding and rotating parts of the movement.

C denotes a movable rack arranged parallel with the fixed rack B and guided by suitable means to slide longitudinally, said guiding means being represented as a way $a$ integral with or rigidly secured to the frame A.

A traveling gear D is arranged between the racks B, C and engages both of them, the arbor $d$ of said gear being free to move in a slot $a^1$ formed in the frame parallel with said racks and said gear sliding on parallel ridges or ways $a^2$ $a^3$ raised on the frame A, to lessen friction of said gear on said frame.

The racks B, C and gear D are well known, but instead of applying the power directly to said gear, as by means of a crank, I attach to the gear D concentrically therewith an involute gear E of such radial variation as to be always in mesh with the circular driving spur-pinion F. The driving pinion F turns about a fixed center $f$, being mounted on a bracket $f^2$ integral with or rigidly secured to the frame A, as by bolts $f^3$ $f^4$, and may be operated by a crank $f^5$ attached to said driving pinion in an obvious manner.

The travel of the movable rack C may be utilized directly or through the medium of a rod G attached to said rack.

I claim as my invention:—

1. In combination with two parallel racks, one of which is fixed and the other of which is movable, and a traveling gear engaging both of said racks, a driving pinion turning about a fixed center, and an involute gear concentric with said traveling gear and fast thereon and in continuous engagement with said driving pinion.

2. In combination with two parallel racks, one of which is fixed and the other of which is movable, and a traveling gear engaging both of said racks, a driving pinion turning about a fixed center, and a gear having a variable radius and secured to said traveling gear concentrically therewith and in continuous engagement with said driving pinion.

In witness whereof, I have affixed my signature in presence of two witnesses.

CHARLES E. GEE.

Witnesses:
     ALBERT M. MOORE,
     FRANK B. MURPHY.